(12) United States Patent
Tang

(10) Patent No.: US 6,594,350 B2
(45) Date of Patent: Jul. 15, 2003

(54) DIAL ON DEMAND COMMUNICATION

(76) Inventor: Bob Tang, Flat 6, 2A Kimberley Gardens, London N4 1LB (GB)

( * ) Notice: Subject to any disclaimer, the term of this patent is extended or adjusted under 35 U.S.C. 154(b) by 0 days.

(21) Appl. No.: 09/991,250

(22) Filed: Nov. 16, 2001

(65) Prior Publication Data

US 2002/0034282 A1 Mar. 21, 2002

Related U.S. Application Data

(63) Continuation of application No. PCT/GB00/01877, filed on May 17, 2000.

(30) Foreign Application Priority Data

May 18, 1999 (GB) .............................................. 9911484
Jun. 15, 1999 (GB) .............................................. 9913748

(51) Int. Cl.[7] .......................................... H04M 11/00
(52) U.S. Cl. ................................. 379/93.34; 379/93.08; 379/90.01; 379/142.15; 379/142.06
(58) Field of Search ............... 379/90.01, 93.05–93.07, 379/93.02, 93.08–93.11, 93.14, 93.17, 93.21, 93.23–93.26, 93.28, 93.31–93.34, 142.01, 142.04, 142.06, 142.15, 900; 709/227, 228, 237

(56) References Cited

U.S. PATENT DOCUMENTS

| | | | |
|---|---|---|---|
| 4,817,114 A | | 3/1989 | Boer et al. |
| 5,764,736 A | * | 6/1998 | Shachar et al. .......... 379/93.09 |
| 5,841,850 A | * | 11/1998 | Fan ........................ 379/142.06 |
| 6,085,247 A | * | 7/2000 | Parsons, Jr. et al. ........ 709/227 |
| 6,192,050 B1 | * | 2/2001 | Stovall ........................ 709/227 |
| 6,259,774 B1 | * | 7/2001 | Miloslavsky ............. 379/90.01 |

FOREIGN PATENT DOCUMENTS

| | | |
|---|---|---|
| GB | 2 345 406 | 7/2000 |
| WO | WO 97 37458 | 10/1997 |
| WO | WO 99 12380 | 3/1999 |

* cited by examiner

Primary Examiner—Wing Chan

(57) ABSTRACT

The methods bypass present lengthy modem renegotiations (typically 20–30 seconds) to effect fast re-establishment of ISO Application-Oriented Layer communication link between user Application Programs/Browsers and Internet Service Provider, and enables complete session continuity without user being aware of noticeable difference due to frequent connections/disconnections of PSTN line. The methods at its most basic essence requires that the reconnecting incoming calls be routed to the same Port #/Modem unit/Data channel.

23 Claims, 3 Drawing Sheets

DIAL ON DEMAND COMMUNICATION

Figure 1:
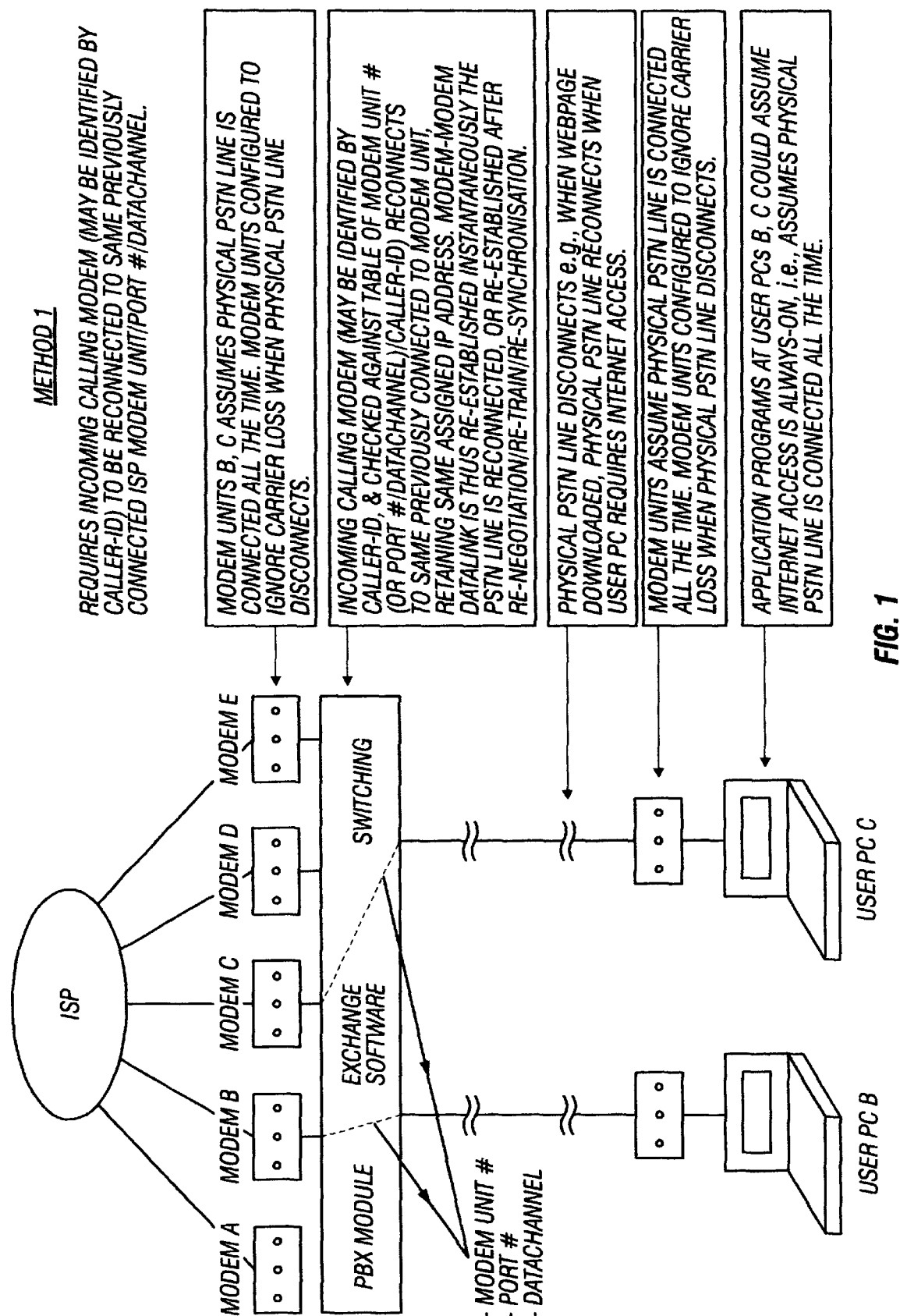
Figure 2:
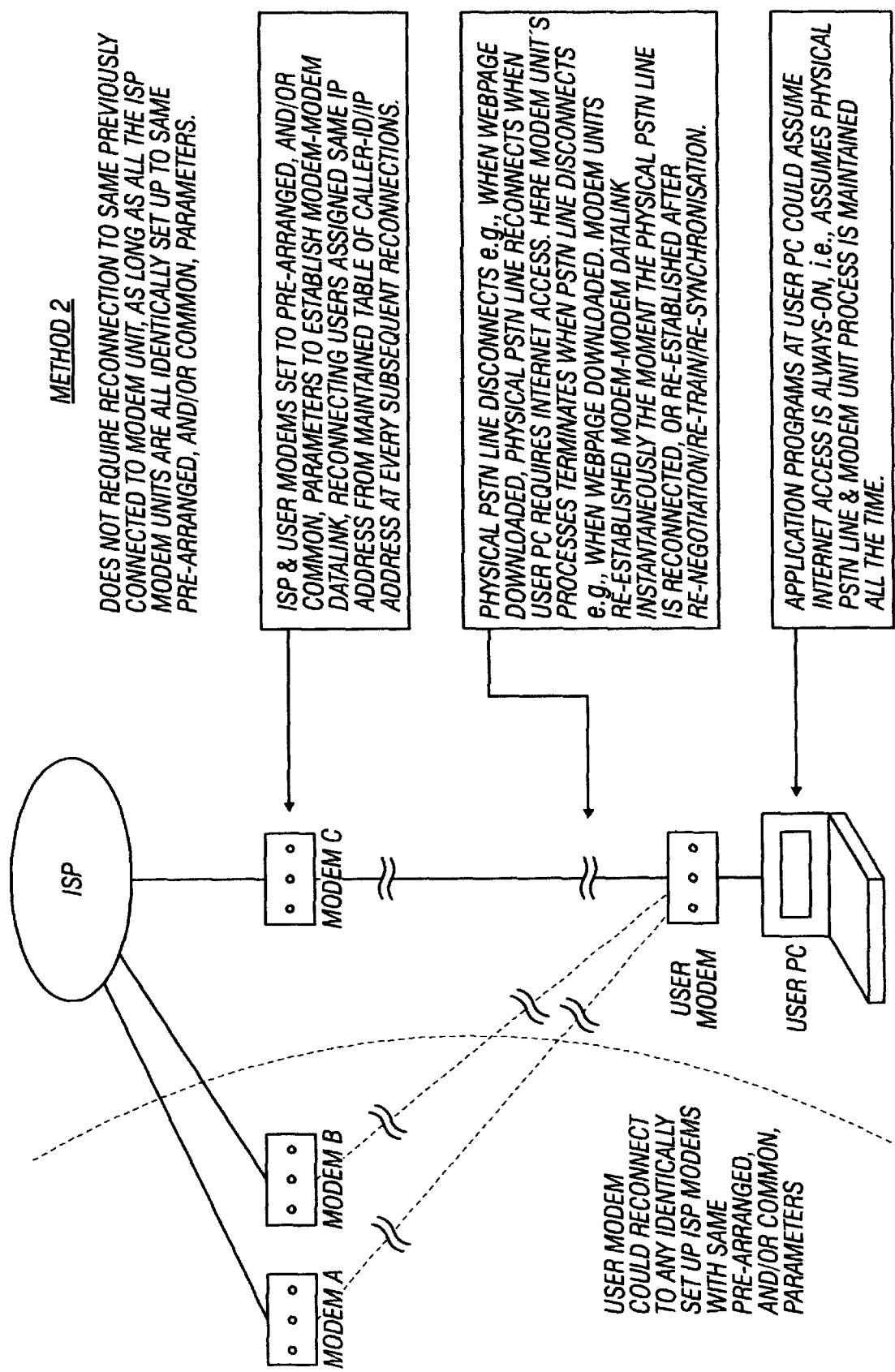
Figure 3:
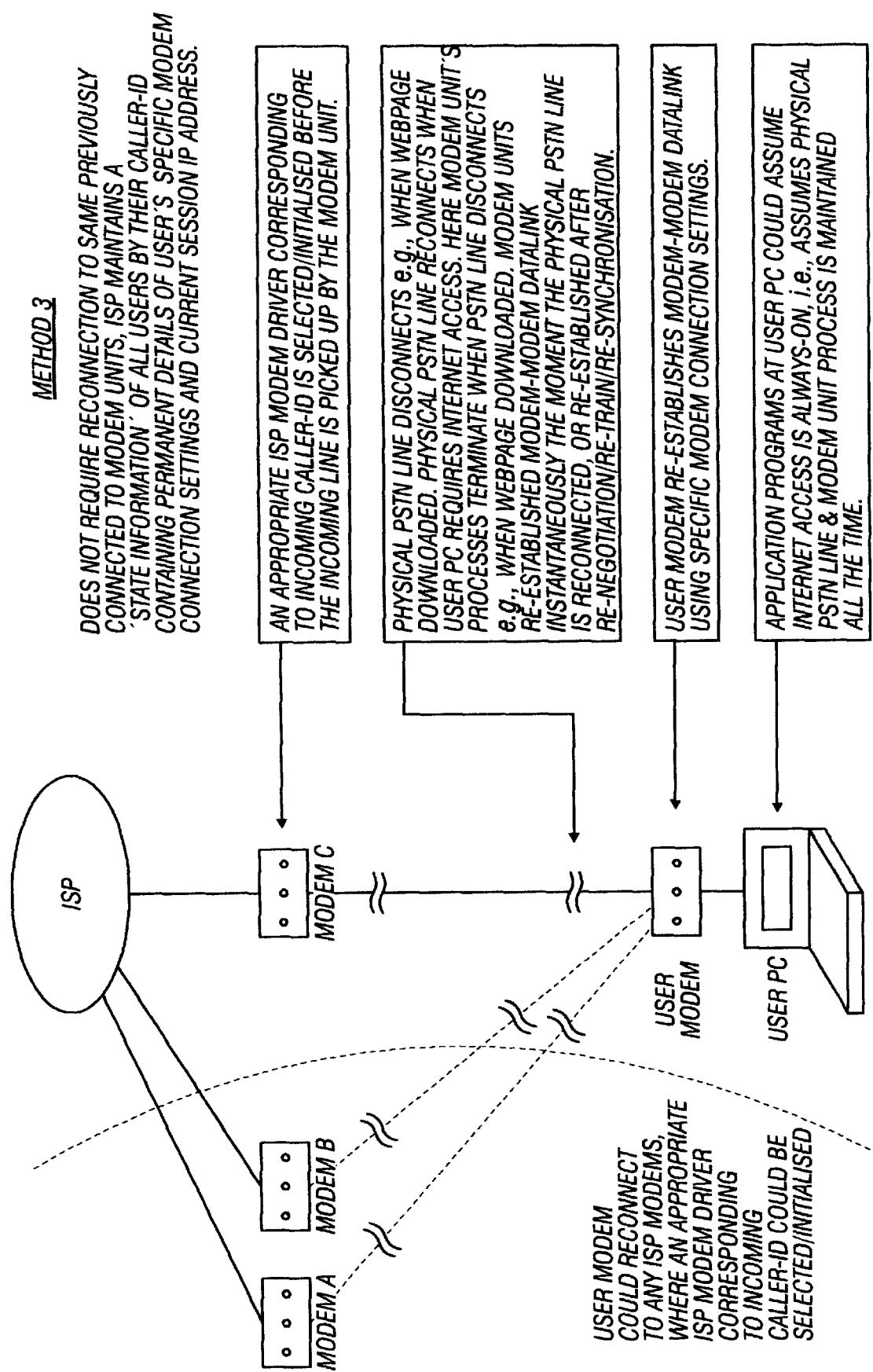

This is a continuation of PCT/GB00/01877, filed May 17, 2000.

This invention relates to dial on demand communication between two computers.

According to one aspect of the present invention there is provided a method of accessing the internet from a user computer system via a public switched telephone network, the user computer system comprising a communication device for connecting to the public switched telephone network to allow the reception of web page related data, the method comprising the steps of:

detecting when downloading of a webpage has been completed; and
  disconnecting the user computer from the public switched telephone network when it has been detected that downloading of a webpage has been completed.

Embodiments of the present invention will now be described by way of example only.

Fast Dial-on-Demand establishes the physical line connections only upon request from user's application programs (such as web browser) and disconnects when not in use for data transmissions, eliminating requirement for the PSTN connection to be maintained throughout the user session thus achieving substantial cost savings.

The methods presented here bypass present lengthy modem renegotiations (typically 20–30 seconds) to effect fast re-establishment of ISO application-Oriented Layer communications link between user Application Programs/Browsers and Internet Service Provider, and enables complete session continuity without user being aware of noticable difference due to frequent connections/disconnections of PSTN line.

METHOD 1

Internet Service Provider implements a PBX module which monitors incoming calls extracting DTMF Caller-ID (ie caller's phone number) and checks against existing maintained table of modem unit # (or Port #, Data channel)/Caller-ID to switch the incoming call to the corresponding modem unit (or Port #/Data channel))if found on the table. If not already on the table, it will be treated as first time dial-up connection, whereupon the usual modem negotiations, authentications and Dynamic IP address assignment will take place and thereafter a new modem unit #(or Port #, data channel)/Caller-ID entry for this session connection will be created on the Table.

The ISP could set the idle Period before terminating session to say 15 minutes; if there has been no transmission line activities during this period the user's Dial-on-Demand session will be terminated, the modem unit and Dynamically assigned IP address returned to resource pool, and the corresponding modem unit # (or Port #, data channel)/caller-ID entry removed from Table. This prevents tying up of modem(or Port, datachannel), IP address resources by inactive Dial-on-demand sessions.

The ISP modem setting for elapsed time period before terminating line connection upon NO CARRIER DETECT (ie caused by user Dial-on-demand software package hanging up telephone line when there are no data transmissions) could be set to the same 15 minutes above, to allow for subsequent instantaneous modem reconnections to new incoming calls by the same user session if within the 15 minutes period after user Dial-on-Demand software package last hanging up on the PSTN line connection.

The user Dial-on-demand software package could be set by user to hang up on the PSTN line connection to ISP after a period of say 45 seconds transmissions inactivity to save on phone costs. Most browsers have webpage access connection time-out of around 30 seconds, ie browsers will abort attempt to download webpage if access to the URL site clicked on was not established by then. Within the next 15 minutes after hanging up whenever the Dial-on-demand software package detects via user's Operating System (eg Telecommunication Application Programming Interface environment of Microsoft Windows Operating systems) user program's request for Internet access, the software package redials the ISP number, whereupon the ISP module checks the incoming Caller-ID against Table of modem unit # (or Port#, Data channel)/Caller-ID to route the incoming call to be connected to the corresponding modem unit (or Port #, data channel) it was previously connected to. The Dial-on-Demand Software Package insulates the user's Application Programs/Browsers from the PSTN line connection/disconnection events: the Application Programs/Browsers could assume the PSTN line is connected all the time.

The user Dial-on-Demand software package could further saves on phone connection costs by immediately hanging up PSTN line when webpages/files download from Internet site is completed, or when browser is not expecting any further incoming response to outgoing transmissions sent. The status/events are detected by software package from the informations contained in Operating System (eg Telephony Applications Programming Interface environment of Windows).

The user Dial-on-demand software package could also monitors incoming call's DTMF Caller-ID from ISP during the next 15 minutes above after software package hanging up the PSTN line connection (which signifies that there's incoming data transmission while the PSTN line is hung up after inactivity period of 45 seconds above, were ISP server software incorporated Dialling to user to notify of incoming transmissions for the Session); upon such detection to redial to ISP, whereupon the ISP PBX module effects fast re-establishment of communication link.

The method enables apparent user's full session-continuity, ie HTTP/FTP/TELNET/ONLINE GAMING/AUDIOVISUAL STREAMING continuities.

The method at its most basic essence requires that the reconnecting incoming calls be routed to the same Port#/Modem unit/Data channel (eg to the same DS0 of the ISP's PRI). As a very basic workable example (only one of several!) of PBX Module implementation for ISPs with Lucent Technology PortMaster4 and PRI lines (note that there is no modem banks deployed here), all that is required is for the ISP's Telecommunication Service Provider to customise the Exchange Switching Software to suppress the disconnection event and reserve the same DS0 of the PRI for Dial-in subscriber to reconnect (identified by Caller-ID) within the said 15 minutes after disconnection. Where subscriber does not reconnect within the said 15 minutes, the Exchange Switching terminates and releases the DS0 in the usual manner. The DS0 link is treated by ISP as 'live' (thus enabling Dial-in subscriber to reconnect the PSTN line and be immediately Online again to continue the same Session from where was left off retaining the same Session IP address) for 15 minutes after Dial-in subscriber's disconnection, although no datacommunication is possible until Dial-in subscriber reconnects the PSTN line (routed by Exchange Switching Software to the same DS0) within the same 15 minutes.

METHOD 2

By having a pre-arranged common modem settings, eg specific common connection rate (eg 56 KBS), hardware flow control, parity, compression, and installing modified modem drivers to connect at above pre-arranged common settings at both ISP & user modems, lengthy modem negotiations is bypassed for every Dial-ins achieving fast establishment (eg 1 second–4 seconds) of ISO Application-Oriented Layer communication link.

The ISP access authentication server system only needs to maintain/check a table of current Session dynamic IP address assigned/Caller-ID to ensure that the reconnecting user gets assigned the same IP address at every subsequent reconnections if reconnecting with a period of say 1 hour since last PSTN line disconnection (else the corresponding IP address/Caller-ID entry is removed from Table and the IP is returned to the resource pool). If the Caller-ID is not on the Table on user dial-in, the server will dynamically assign a new IP address for the session, and create a corresponding current Session dynamic IP address assigned/Caller-ID entry on the Table.

On its own, or together with user Dial-on-demand software package described in Method 1, this Method enables apparent user's full session-continuity, ie HTTP/FTP/TELNET/ONLINE GAMING/AUDIOVISUAL STREAMING continuities.

METHOD 3

The ISP maintains a 'State Information' of all users by their Caller-ID. The 'State Information' contains permanent details of user's modem connection settings (eg user specific connection speed/protocol, flow control method, parity, compression method) and details of user's current Dynamically assigned IP address for the Session. The user modem driver is modified to connect at above user specific settings, & an appropriate ISP modem driver is selected corresponding to the incoming Caller-ID & assigned to the ISP modem unit, before the incoming line is picked up by the modem unit, hence doing away with lengthy modem negotiations.

Upon detection of DTMF Caller-ID for the Dial-in to a modem, the ISP server will select an appropriate modem driver & set the modem unit to the user specific modem setting details contained in the Caller-ID's 'State Information' before the modem unit picks up the incoming line thus bypassing lengthy modem negotiations, authenticates user and assigns user with the same IP address entry in the 'State Information' if present. If IP address is absent the ISP access authentication server will dynamically assign a new IP address to user for the Session, and record it in user's current Dynamically assigned Session IP address field of user's 'State Information'. After a pre-set Idle Period of say 1 hour the entry in Session IP address from the field in 'State Information' is removed & the IP address is returned to resource pool (to prevent excessive typing up of IP resource by inactive sessions), and any subsequent Dial-in will then be assigned a new new Session IP address.

On its own, or together with user Dial-on-Demand software package described in Method 1, this method enables fast establishments (eg 1 second–4 seconds) of ISO Application-Oriented Layer communication link, together with apparent user's full session-continuity, ie HTTP/FTP/TELNET/ONLINE GAMING/AUDIOVISUAL STREAMING continuities.

NOTES

1. Modem units referred to may be virtual/software modems, eg Lucent Technology PM4's Modem DSP with PRI lines: the connecting of incoming DS0 from PRI to specific DSP could also be effected by assigning incoming DS0 to the the same TDM bus slot of the Modem DSP.

2. The Dial-on-Demand software package is here described for predominantly Internet usage, but is also applicable for use in connection between any two user application programs on two computers connected by analog modems via PSTN line.

3. Method 1 described above may also be appled for users with digital Terminal Adapters instead of analog Modems.

According to a particular aspect of the invention there is provided a method for Dial-on-Demand Internet access with analog modems at user sides, via Public Switched Telephone Networks, enabling session continuity without user being aware of noticable difference due to frequent connections/disconnections of physical PSTN line, said method having the Internet Service Provider implements a PBX module which monitors incoming calls extracting DTMF Caller-ID and checks against existing maintained Table of Modem Unit #(or Port #/Datachannel)/Caller-ID to switch the reconnecting PSTN line to the same Modem Unit #(or Port#/Datachannel) before, the ISP's Modem Unit(or Port/Datachannel) is kept 'live' for a preset time period since last PSTN disconnection enabling Dial-on-Demand users to reconnect the PSTN line within the preset time period and be immediately Online again to continue the same Session from where was left off retaining the same assigned Session IP Address; user's Dial-on-Demand Software Package reconnects the physical PSTN line whenever user's Application Programs/Browser requires Internet access, and insulates user's Application Programs/Browsers from the PSTN disconnection/reconnection events; the ISP dials to alert user when it needs to transmit data to user and the physical PSTN line is disconnected, user Dial-on-Demand Software Package upon detecting the ISP's Caller-ID dials to reconnect the physical PSTN line.

A development of the above method is also envisaged, said method having the PBX module implemented by the ISP's Telecommunication Service Provider in the Exchange Switching Software, customising for the ISP access # so that reconnecting calls within a preset time period, based on their Caller-IDs are routed to the same Port #/Datachannel before, the Port#/Datachannel being reserved for the Caller-ID for a preset time period since user last Disconnects; the ISP's Modem Unit(or Port/Datachannel) is kept 'live' for a preset time period since last PSTN disconnection enabling Dial-on-Demand users to reconnect the PSTN line within the preset time period and be immediately Online again to continue the same Session from where was left of retaining the same assigned Session IP Address; user's Dial-on-Demand Software Package reconnects the physical PSTN line whenever user's Application Programs/Browser requires Internet access, and insulates user's Application Programs/Browsers from the PSTN disconnection/reconnection events; the ISP dials to alert user when it needs to transmit data to user and the physical PSTN line is disconnected, user Dial-on-Demand Software Package upon detecting the ISP's Caller-ID dials to reconnect the physical PSTN line.

According to another particular aspect of the invention there is provided a method for Dial-on-Demand Internet access with analog modems at user sides, via Public Switched Telephone Networks, enabling session continuity without user being aware of noticable difference due to frequent connections/disconnections of physical PSTN line, said method having a pre-arranged common modem connection settings for users to connect to ISP; the ISP checks a Table of current Session dynamic IP assigned/Caller-ID to ensure the reconnecting user gets assigned the same IP Address at every subsequent reconnections if reconnecting within a preset time period since last physical PSTN line disconnection; user's Dial-on-Demand Software Package reconnects the physical PSTN line whenever user's Application Programs/Browser requires Internet access, and insulates user's Application Programs/Browsers from the PSTN disconnection/reconnection events; the ISP dials to alert user when it needs to transmit data to user and the physical PSTN line is disconnected, user Dial-on-Demand Software Package upon detecting the ISP's Caller-ID dials to reconnects the physical PSTN line.

According to yet another particular aspect of the invention there is provided a method for Dial-on-Demand Internet access with analog modems at user sides, via Public Switched Telephone Networks, enabling session continuity without user being aware of noticable differences due to frequent connections/disconnections of physical PSTN line, said method having the ISP maintains a 'State Information' of all users by their Caller-ID containing permanent details of user's specific modem connection settings and details of user's current Dynamically assigned IP Address for the Session, to select/initialise an appropriate ISP Modem Driver corresponding to the incoming Caller-ID before the incoming line is picked up by the modem unit; the ISP assigns reconnecting user with the same Session IP Address as before if reconnecting within a preset time period; user's Dial-on-Demand Software Package reconnects the physical PSTN line whenever user's Application Programs/Browser requires Internet access, and insulates user's Application Programs/Browsers from the PSTN disconnection/reconnection events; the ISP dials to alert user when it needs to transmit data to user and the physical PSTN line is disconnected, user Dial-on-Demand Software Package upon detecting the ISP's Caller-ID dials to reconnect the physical PSTN line.

What is claimed is:

1. A method of accessing the internet from a user computer system via a public switched telephone network, the user computer system comprising a communication device for connecting to the public switched telephone network to allow the reception of web page related data, the method comprising the steps of:

detecting when downloading of a webpage has been completed; and disconnecting the user computer from the public switched telephone network when it has been detected that downloading of a webpage has been completed.

2. A method of accessing the internet according to claim 1 comprising the further steps of: reconnecting the user computer to the public switched telephone network when user computer requires internet access; and insulating at least one of a browser and another application program running on the user computer from the disconnection and reconnection events thus preserving session continuity.

3. A method of internet access by which a plurality of user computer systems may access the internet through a central computer system via a public switched telephone network, each user computer system comprising a communication device for connecting to the public switched telephone network to allow the reception of web page related data, the central computer system comprising a communication device module comprising a plurality of communication device elements, each communication device element having a unique identifier and being arranged for making a separate connection to the public switched telephone network, and said method comprising the steps of, at the central computer system:

receiving calls from the user computer systems and extracting a caller ID from each call;

assigning a communication device element to each computer system from which a call has been received;

maintaining a table associating the extracted caller IDs and the unique identifiers of the respective assigned communication device elements;

monitoring the termination of calls due to disconnection;

deleting from said table an extracted caller ID and the associated unique identifier when a time period since a call associated with that caller ID was last terminated by a disconnection exceeds a predetermined period;

whilst an extracted caller ID and associated unique identifier is present in the table, keeping the respective communication device element in a condition which allows reconnection by the respective user computer; and the further step of checking the extracted caller ID against the table each time a cell is received and, if the respective extracted caller ID is absent from the table, performing first time dial-up connection operations and making a new entry in the table but if the respective extracted caller ID is present in the table, reconnecting the respective user computer system to the respective assigned communication device element;

the method comprising the further steps of, at each user computer:

detecting when downloading of a webpage has been completed; and disconnecting the user computer from the public switched telephone network when it has been detected that downloading of a webpage has been completed.

4. A dial-on-demand method of communication between a plurality of user computer systems and a central computer system via a public switched telephone network, each user computer system comprising a communication device for connecting to the public switched telephone network, the central computer system comprising a communication device module comprising a plurality of communication device elements, each communication device element being arranged for making a separate connection to the public switched telephone network, and said method comprising the steps of, at the central computer system:

arranging the communication device elements to have common predetermined connection settings;

receiving calls from the user computer systems and extracting a caller ID from each call;

assigning an IP address to each computer system from which a call has been received;

maintaining a table associating the extracted caller IDs and the respective assigned IP addresses;

monitoring the termination of calls due to disconnection;

deleting from said table an extracted caller ID and the associated IP address when a time period since a call associated with that caller ID was last terminated by a disconnection exceeds a predetermined period; and the further step of checking the extracted caller ID against the table each time a call is received and, if the respective extracted caller ID is absent from the table performing first time dial-up connection operations and making a new entry in the table but if the respective extracted caller ID is present in the table reconnecting the respective user computer system to an available communication device element, and continuing to use the assigned IP address.

5. A dial-on-demand method of communication between a plurality of user computer systems and a central computer system via a public switched telephone network, each user computer system comprising a communication device for connecting to the public switched telephone networks the central computer system comprising a communication device module comprising a plurality of communication device elements, each communication device element having a unique identifier and being arranged for making a separate connection to the public switched telephone network and said method comprising the steps of, at the central computer system implements a PBX Module to switch the reconnecting PSTN line to the same Modem Unit Number or Port Number or Datachannel as before, the respective communication device elements are kept in a condition which allows reconnection by the respective user computer for a preset time period since last PSTN disconnection enabling user computer to reconnect the PSTN line within the preset time period, to re-negotiate or retrain or re-synchronise modem-to-modem data link, to continue the same Session from where was let off retaining the same assigned Session IP address.

6. A method according to claim 5, where the modems renegotiate or re-train or re-synchronise modem-to-modem data link with pre-arranged modem connection settings.

7. A method according to claim 5, said method having the Central Computer System implements a PBX Module which monitors incoming calls extracting DTM Caller-ID and checks against existing maintained Table of Modem Unit Number or Port Number or Datachannel/Caller-ID to switch the reconnecting PSTN line to the same Modem Unit Number or Port Number of Datachannel as before.

8. A dial-an-demand method of communication according to claim 5 or 6 or 7, in which reconnecting of calls through to the same Modem Unit or Port or Datachannel (PBX Module) is implemented by exchange switching software provided by a telecommunications service provider.

9. A dial-on-demand method of communication between a plurality of user computer systems and a central computer system via a public switched telephone network, each user computer system comprising a communication device for connecting to the public switched telephone network, the central computer system comprising a communication device module comprising a plurality of communication device elements, each communication device element having a unique identifier and being arranged for making a separate connection to the public switched telephone network, and said method comprising the steps of, at the central computer system:

receiving calls from the user computer systems and extracting a caller ID from each call;

assigning a communication device element to each computer system from which a call has been received;

maintaining a table associating the extracted caller IDs and the unique identifiers of the respective assigned communication device elements;

monitoring the termination of calls due to disconnection;

deleting from said table an extracted caller ID and the associated unique identifier when a time period since a call associated with that caller ID was last terminated by a disconnection exceeds a predetermined period;

whilst an extracted caller ID and associated unique identifier is present in the table, keeping the respective communication device element in a condition which allows reconnection by the respective user computer; and the further step of checking the extracted caller ID against the table each time a call is received and, if the respective extracted caller ID is absent from the table, performing first time dial-up connection operations and making a new entry in the table but if the respective extracted caller ID is present in the table, reconnecting the respective user computer system to the respective assigned communication device element.

10. A dial-on-demand method of communication according to claim 9 comprising the further step of, at a user computer system, after having established a connection with the central computer via the public switched telephone network, disconnecting from the public switched telephone network when the connection is not in use for data communications.

11. A dial-on-demand method of communication according to claim 9 comprising the further step of dialling out from the central computer system to a user computer system when the central computer system has a requirement to transmit data to that user computer system and there is no public switched telephone network connection between the central computer system and that user computer system.

12. A dial-on-demand method of communication according to claim 11 comprising the further steps of, at said that user computer system, detecting a call from the central computer system by identification of the central computer system caller ID, and calling the central computer to re-establish the public switched telephone network connection between the central computer system and that user computer system.

13. A dial-on-demand method of communication according to claim 10 comprising the further step of dialling out from the central computer system to a used computer system when the central computer system has a requirement to transmit data to that user computer system and there is no public switched telephone network connection between the central computer system and that user computer system.

14. A dial-on-demand method of communication according to claim 13 comprising the further steps of, at said that user computer system, detecting a call from the central computer system by identification of the central computer system caller ID, and calling the central computer to re-establish the public switched telephone network connection between the central computer system and that user computer system.

15. A dial-on-demand method of communication according to claim 9 in which routing of calls through to assigned communication device elements is implemented by exchange switching software provided by a telecommunications service provider.

16. A dial-on-demand method of communication according to claim 9 comprising the step of providing prearranged common communication connection settings for the communication devices of users who may connect to the central computer system.

17. A dial-on-demand method of communication according to claim 9 in which a PBX module for routing calls to assigned communication device elements is provided and is implemented by a telecommunication service provider in exchange switching software, each communication device element comprises one of a modem unit, a port and a datachannel, and when reconnecting during said predetermined period, a user computer communication device and the respective communication device element re-negotiate/re-train/re-synchronise with previously used connection settings to re-establish the communication device to communication device element data link to continue the same session as that before disconnection, retaining the same assigned session IP address.

18. A dial-on-demand method of communication according to claim 9 comprising the step of maintaining, at the central computer system, state information of all users in association with the respective caller IDs, the state information for each user comprising permanent details of the user's specific communication device connection settings and details of the user's currently dynamically assigned IP address for the session, the dynamic information being stored for said predetermined period since a call associated with that caller ID was last terminated by a disconnection.

19. A dial-on-demand method of communication according to claim 9 in which each communication device is an analogue modem.

20. A dial-on-demand method of communication according to claim 9 in which the each communication device is a digital terminal adapter.

21. A dial-on-demand method of communication according to claim 9 in which the unique identifier of each communication device element is one of a modem unit number, a port number, and a data channel.

22. A dial-on-dement method of communication according to claim 9 which is a method for dial-on-demand internet access where the central computer is provided by an internet service provider.

23. A dial-on-demand method of communication between a plurality of user computer systems and a central computer system via a public switched telephone network, each user computer system composing a communication device for connecting to the public switched telephone network, the central computer system comprising a communication device module comprising a plurality of communication device elements, each communication device element being arranged for making a separate connection to the public switched telephone network, and said method comprising the steps of, at the central computer system:

receiving calls from the user computer systems and extracting a caller ID from each call;

assigning an IP address to each computer system from which a call has been received;

maintaining a table associating the extracted caller IDs with state information associated with the user computer from which the respective call was received, said state information comprising user computer communication device connection settings and the assigned IP address;

monitoring the termination of calls due to disconnection;

deleting from said table an extracted caller ID and the assigned IP address when a time period since a call associated with that caller ID was last terminated by a disconnection exceeds a predetermined period; and the further step of checking the extracted caller ID against the table each time a call is received and, if the respective extracted caller ID is absent from the table performing first time dial-up connection operations and making a new entry in the table but if the respective extracted caller ID is present in the table reconnecting the respective user computer system to an available communication device element using the associated state information to configure said available communication device element and continuing to use the assigned IP address.

* * * * *